(12) United States Patent
Dichtl

(10) Patent No.: US 10,533,483 B2
(45) Date of Patent: Jan. 14, 2020

(54) COMPENSATOR

(71) Applicant: MAN DIESEL & TURBO SE, Augsburg (DE)

(72) Inventor: Johann Dichtl, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 45 days.

(21) Appl. No.: 15/552,721

(22) PCT Filed: Feb. 13, 2016

(86) PCT No.: PCT/EP2016/000248
§ 371 (c)(1),
(2) Date: Aug. 22, 2017

(87) PCT Pub. No.: WO2016/134828
PCT Pub. Date: Sep. 1, 2016

(65) Prior Publication Data
US 2018/0030877 A1 Feb. 1, 2018

(30) Foreign Application Priority Data

Feb. 23, 2015 (DE) .......................... 10 2015 002 105

(51) Int. Cl.
*F01N 13/18* (2010.01)

(52) U.S. Cl.
CPC ...... *F01N 13/1816* (2013.01); *F01N 2470/12* (2013.01)

(58) Field of Classification Search
CPC ....... F16L 27/10; F16L 27/1008; F16L 27/11; F16L 27/111; F16L 51/02; F16L 51/025; F16L 51/028; F16L 51/03; F16L 51/035

(Continued)

(56) References Cited

U.S. PATENT DOCUMENTS 2,335,478 A 11/1943 Bergman
2,485,370 A * 10/1949 Dreyer .................. F16L 51/035
285/228

(Continued)

FOREIGN PATENT DOCUMENTS

CN 203500755 U 3/2014
CN 203 656 459 6/2014

(Continued)

OTHER PUBLICATIONS

Translation DE 1218821 (Year: 1966).*

(Continued)

*Primary Examiner* — Aaron M Dunwoody
(74) *Attorney, Agent, or Firm* — Cozen O'Connor

(57) ABSTRACT

A compensator, having a first corrugated bellows section, a second corrugated bellows section, an intermediate pipe section positioned between the first corrugated bellows section and the second corrugated bellows section, a first attachment flange, and a second attachment flange. The first corrugated bellows section engages the first attachment flange and intermediate pipe section. The second corrugated bellows section engages the second attachment flange and intermediate pipe section. An intermediate flange is positioned between the first attachment flange and the second attachment flange and surrounds the intermediate pipe section at the outside without a a rigid connection to the intermediate pipe section. The intermediate flange is connected by first tension rods to the first attachment flange and by second tension rods to the second attachment flange.

11 Claims, 4 Drawing Sheets

(58) Field of Classification Search
USPC .......................................... 285/277, 224, 228
See application file for complete search history.

(56) References Cited

U.S. PATENT DOCUMENTS

| | | | | |
|---|---|---|---|---|
| 2,568,923 | A * | 9/1951 | McNeary | F16L 51/035 |
| | | | | 285/114 |
| 3,620,557 | A * | 11/1971 | Sturm | B64G 1/40 |
| | | | | 285/118 |
| 3,659,879 | A | 5/1972 | Stalph | |
| 3,871,689 | A * | 3/1975 | Zaderei | F16L 5/025 |
| | | | | 174/13 |
| 3,930,675 | A | 1/1976 | Sasse | |
| 4,487,436 | A * | 12/1984 | Mares | F16L 27/026 |
| | | | | 285/228 |
| 5,248,170 | A * | 9/1993 | Francis | F16L 51/035 |
| | | | | 138/120 |
| 5,299,840 | A * | 4/1994 | Heye | F16L 51/03 |
| | | | | 285/114 |
| 5,791,144 | A * | 8/1998 | Thompson | F02B 29/04 |
| | | | | 123/563 |
| 6,065,780 | A * | 5/2000 | Hiroshima | F16L 27/11 |
| | | | | 285/226 |
| 8,925,972 | B2 * | 1/2015 | Ivancic | F16L 51/03 |
| | | | | 285/227 |
| 2007/0176417 | A1 * | 8/2007 | Nuccitelli | F16L 27/111 |
| | | | | 285/227 |
| 2009/0230676 | A1 | 9/2009 | Rohwedder | |
| 2013/0015653 | A1 * | 1/2013 | Cipra | F02K 9/84 |
| | | | | 285/114 |
| 2016/0069491 | A1 * | 3/2016 | Holbach | F16L 27/1085 |
| | | | | 285/223 |

FOREIGN PATENT DOCUMENTS

| | | |
|---|---|---|
| CN | 103836291 | 6/2014 |
| DE | 12 18 821 | 6/1966 |
| DE | 44 36 514 | 4/1996 |
| DE | 4436514 | 4/1996 |
| EP | 1967783 | 9/2008 |
| GB | 1 344 998 | 1/1974 |
| JP | S 56-56980 U | 5/1981 |
| JP | S 57-61294 U | 4/1982 |
| JP | 59-146688 U | 10/1984 |
| JP | 05-050283 U | 7/1993 |
| JP | H 05-340497 | 12/1993 |
| JP | 2008-542640 | 11/2008 |
| KR | 2014 0096558 | 8/2014 |

OTHER PUBLICATIONS

Office Action dated Dec. 14, 2018 issued in Korean Patent Application No. 10-2017-7020654.
Office Action dated Oct. 8, 2018 issued in Chinese Patent Application No. 201680011769.0.
Office Action dated Jul. 30, 2018 which issued in the corresponding Japanese Patent Application No. 2017-544605.
Office Action dated Sep. 27, 2019 issued in India Patent Application No. 201747029548.

* cited by examiner

COMPENSATOR

CROSS REFERENCE TO RELATED APPLICATIONS

This is a U.S. national stage of application No. PCT/EP2016/000248, filed on Feb. 13, 2016. Priority is claimed on German Application No. DE 102015002105.2, filed Feb. 23, 2015, the content of which is incorporated here by reference.

BACKGROUND OF THE INVENTION

1. Field of the Invention

The invention relates to a compensator.

2. Description of the Prior Art

In piping systems, such as for example in exhaust systems, compensators are employed to compensate for movements in the piping system caused for example as a consequence of temperature cycles. According to the three fundamental types of movement, the prior art distinguishes axial compensators, angular compensators, lateral compensators, and universal compensators. Axial compensators serve for absorbing movements in axial direction. Angular compensators absorb bends or angular movements. Lateral compensators compensate for transverse movements or lateral movements. Universal compensators compensate for movements in all space directs as well as contortions about the bending axes. Because of axially acting internal pressure reaction forces, axial compensators and universal compensators can only be employed in systems with low pressure or with low nominal widths.

Lateral compensators known from practice typically comprise two corrugated bellows sections, between which an intermediate pipe section is positioned. Furthermore, lateral compensators known from practice preferentially comprise two connection flanges, wherein a first corrugated bellows section acts on a first connection flange and on the intermediate pipe section, and wherein a second corrugated bellows section acts on a second connection flange and likewise on the intermediate pipe section. As already explained, the intermediate pipe section is arranged between the two corrugated bellows sections.

Lateral compensators known from practice cannot compensate for bends or angular movements. In order to be able to additionally absorb angular movements in all bending planes, two angular compensators with cardanic joint have to be installed in addition to a lateral compensator. This is disadvantageous for reasons of cost and installation space.

There is therefore a need for a new type of compensator which expands the function of a lateral compensator, namely in such a manner that the same, in addition to transverse or lateral movements, can also compensate for bends or angular movements in both bending planes.

SUMMARY OF THE INVENTION

One aspect of the invention is based a new type of compensator.

According to one aspect of the invention, the compensator comprises an intermediate flange positioned between the first connection flange and the second connection flange that surrounds the intermediate pipe section on the outside without connection or without rigid connection to the same, wherein the intermediate flange is connected via first tension rods to the first connection flange and via second tension rods to the second connection flange. The compensator according to the invention can compensate for lateral movements as well as all-axial bending contortions. It is characterized by a low weight and a low installation space requirement.

According to an advantageous development, the first tension rods, via which the intermediate flange is connected to the first connection flange, lie on a first axis, wherein the second tension rods, via which the intermediate flange is connected to the second connection flange, lie on a second axis, wherein the first axis and the second axis preferentially intersect in such a manner that a point of intersection of the axes lies in the interior of the compensator and the first axis and the second axis include an angle of approximately 90°. This embodiment is particularly advantageous for decoupling the compensation of angular movements to take place in different planes.

According to a further advantageous development, a damping element is arranged between the intermediate flange and the intermediate pipe section. The arrangement of a damping element between the intermediate flange and the intermediate pipe section is advantageous both in the case of a horizontal installation position and also in the case of a vertical installation position of the compensator according to one aspect of the invention. In the case of a vertical installation position, an undampened contact between the intermediate flange and intermediate pipe section can be avoided in the event of a vibration excitation, to avoid damaging the compensator in the region of the intermediate pipe section. In the case of a horizontal installation position of the compensator, a defined distance between the intermediate pipe section and the intermediate flange can always be maintained.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
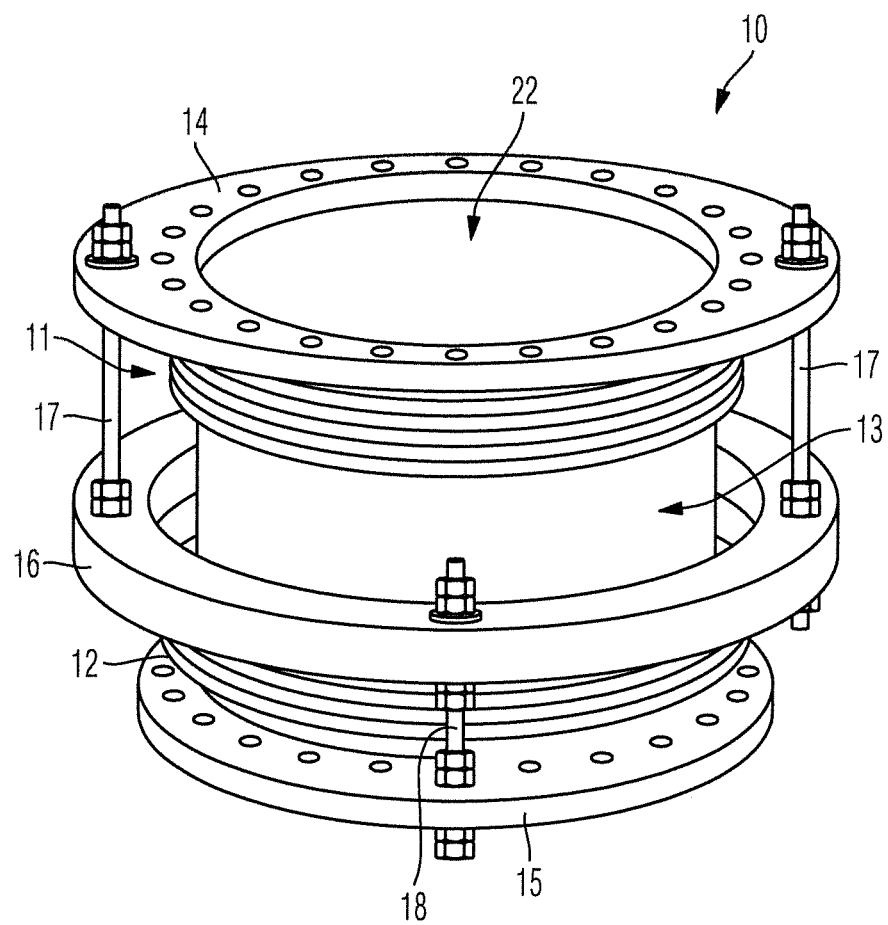
FIG. 1 is a perspective view of a compensator.
Figure 2:
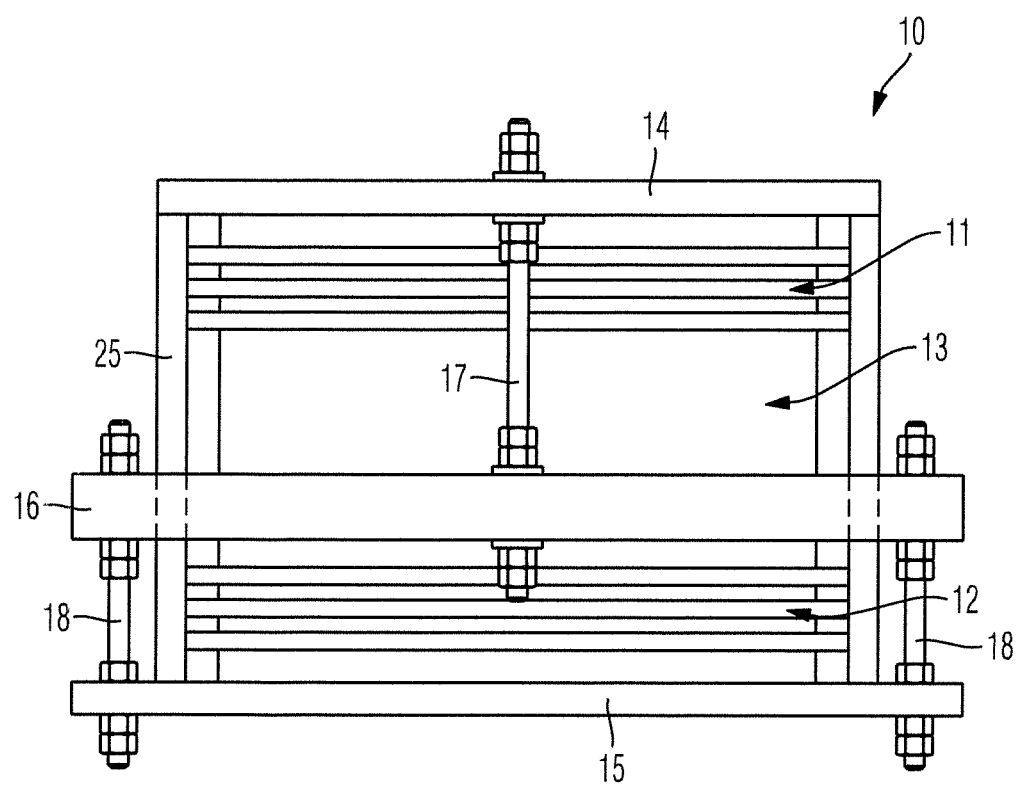
FIG. 2 is a lateral view of the compensator.
Figure 3:
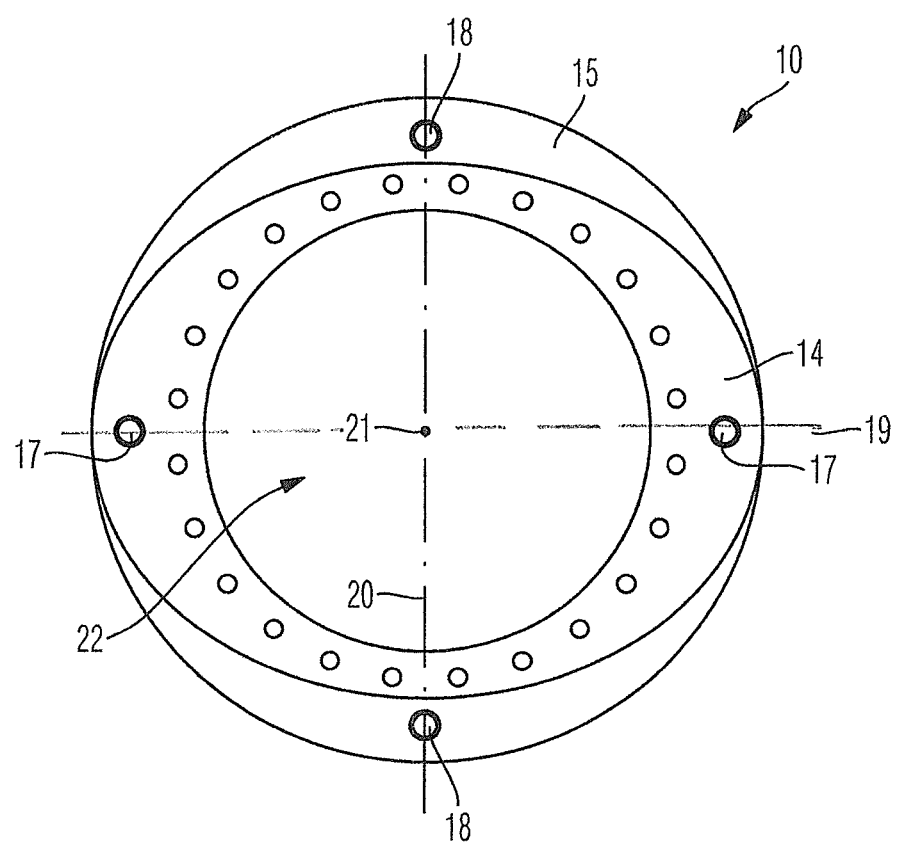
FIG. 3 is a top view of the compensator.
Figure 4:
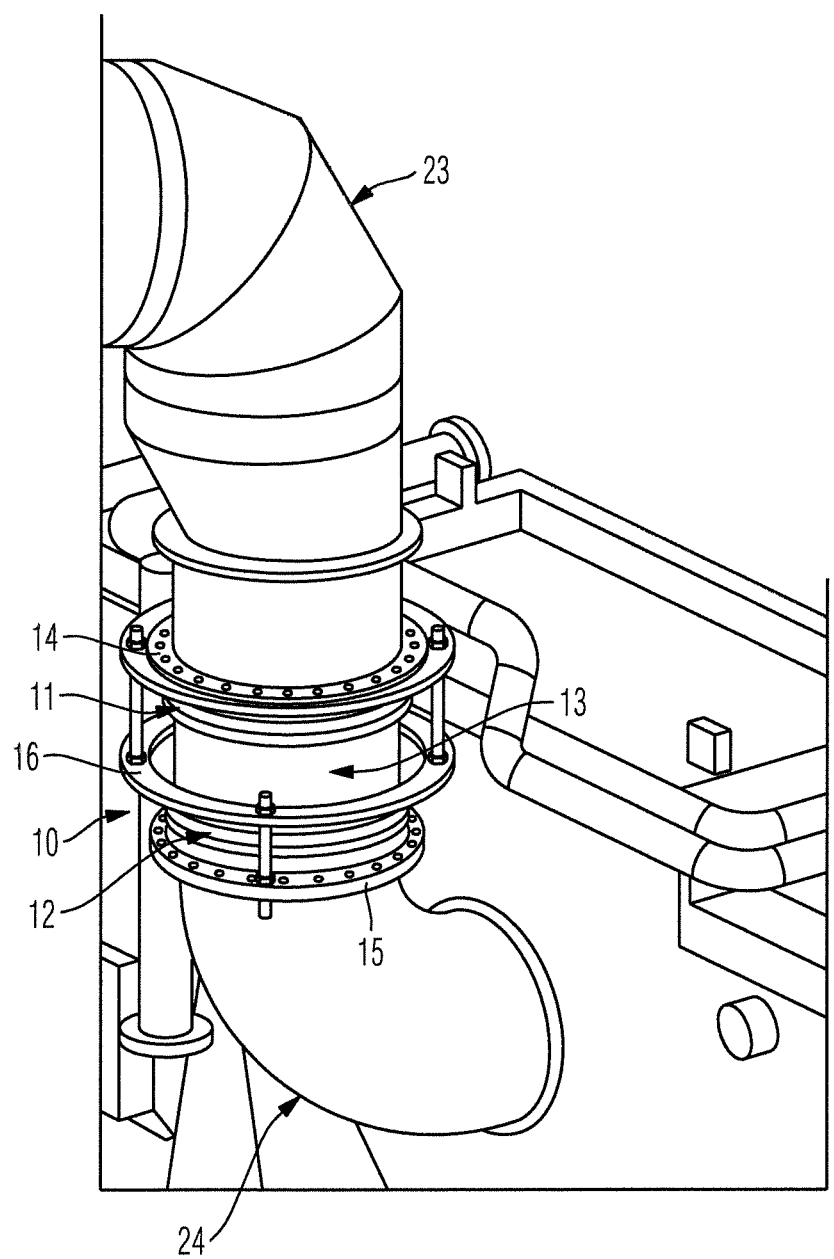
FIG. 4 is the compensator installed in an exhaust system of an internal combustion engine.

The invention relates to a compensator. FIGS. 1 to 3 shows different views of a preferred exemplary embodiment of a compensator 10 according to one aspect of the invention, whereas FIG. 4 shows a preferred installation position or a preferred application case of the compensator 10 in connection with an exhaust system of an internal combustion engine.

The compensator 10 according to one aspect of the invention comprises a first corrugated bellows section 11 and a second corrugated bellows section 12 as well as an intermediate pipe section 13 arranged between the first corrugated bellows section 11 and the second corrugated bellows section 12 that is connected to these in a fixed manner. Furthermore, the compensator 10 according to the invention comprises a first connection flange 14 and a second connection flange 15. The first corrugated bellows section 11 is positioned between the first connection flange 14 and the intermediate pipe section 13. On the opposite side of the intermediate pipe section 13, the second corrugated bellows section 12 is positioned between the second connection flange 15 and the intermediate pipe section 13. The first corrugated bellows section 11 accordingly acts on the one hand on the intermediate pipe section 13 and on the first connection flange 14 in a fixed manner, whereas the second corrugated bellows section 12 acts on the intermediate pipe section 13 and on the second connection flange 15 in a fixed manner.

The compensator 10 according to the invention comprises an intermediate flange 16. The intermediate flange 16 is positioned between the first connection flange 14 and the second connection flange 15 without connection to the intermediate pipe section 13 or without rigid connection to the intermediate pipe section 13, wherein the intermediate flange 16 concentrically surrounds the intermediate pipe section 13 radially on the outside in sections. The intermediate flange 16 loosely hangs between the connection flanges 14 and 15 without or without rigid connection to the intermediate pipe section 13.

The intermediate flange 16 is connected to the first connection flange 14 via first tension rods 17 and via second tension rods 18 to the second connection flange 16. The first tension rods 17, which serve for connecting the intermediate flange 16 to the first connection flange 14, lie, as can best be seen from FIG. 3, on a first axis 19. The second tension rods 18, which serve for connecting the intermediate flange 16 to the second connection flange 15, lie on a second axis 20.

The two axes 19, 20 in this case are aligned relative to one another in such a manner or run relative to one another in such a manner that the same intersect, wherein a point of intersection 21 of the axes 19, 20 lies in the interior of the compensator, namely in the interior of a flow duct 22 defined by the compensator 10. The first axis 19 and the second axis 20 include an angle of 90°±10°, in particular an angle of 90°±5°, preferably an angle of 90°. In this case, compensations of angular movements in different bending directions are completely decoupled from one another.

FIG. 4 shows a preferred installation situation or a preferred application case of the compensator 10 according to one aspect of the invention in an exhaust system of a diesel power plant, wherein the compensator 10 is integrated in a piping system between the first and second turbocharging stage namely in such a manner that the compensator 10 with its first connection flange 14 is connected to a first pipe section 23 and with its second connection flange 15 to a second pipe section 24 of the exhaust system of the diesel power plant. Lateral movements and bending movements caused for example by way of temperature cycles of the exhaust gas, can be completely compensated for by the compensator 10.

In FIG. 4, the compensator 10 according to one aspect of the invention is installed vertically. As is evident from FIG. 2, an element 25 can be positioned between the intermediate pipe section 13 and the intermediate flange 16, which in FIG. 2 is an element 25 consisting of an insulating material which, seen in axial direction, extends not only over the intermediate pipe section 13, but also over the corrugated bellows sections 11, 12 and thus seen in axial direction continuously between the two connection flanges 14, 15. Such an insulating material serves for the thermal insulation but can also serve as damping element in order to, in particular when the compensator 10 is exposed to any vibration excitation, avoid a direct contact between the intermediate flange 16 and the intermediate pipe section 13 and damage to the intermediate pipe section 13 caused by this.

It is pointed out that other damping elements can also be arranged between the intermediate pipe section 13 and the intermediate flange 16 to avoid damaging the intermediate pipe section 13 in the event of any vibration excitation.

Such a damping element or an element consisting of an insulating material is preferentially positioned at least between the intermediate pipe section 13 and the intermediate flange 16 in particular even when the compensator 10 according to one aspect of the invention is installed in a horizontal position.

The compensator according to one aspect of the invention is preferentially completely produced from a metallic material. The compensator 10 can also be produced from metallic materials only in sections. In particular it is provided that the same is formed from metallic materials in the region of the intermediate pipe section 13, in the region of the connection flanges 14, 15, in the region of the intermediate flange 16 and in the region of the tension rods 17, 18. The corrugated bellows sections 11, 12 can also be produced from a non-metallic material, such as a rubber material, a rubber-like material, an elastomer material, or fabric.

The compensator 10 according to one embodiment of the invention accordingly comprises the corrugated bellows sections 11 and 12 and the intermediate pipe section 13 positioned between the same. Furthermore, the compensator 10 comprises the connection flanges 14, 15 and the intermediate flange 16. By way of tension rods 17, 18 positioned on different axes, the intermediate flange 16 is connected to the two connection flanges 14, 15. Compressive forces acting axially can be absorbed just as lateral shifts on all sides and all-axial bending contortions. The compensator 10 is suitable both for a vertical installation and a horizontal installation.

The flanges 14, 15, 16 lie in planes that run parallel to one another. The tension rods 17, 18 run perpendicularly to the flanges but parallel to the through-flow direction of the compensator 10.

As is indicated in FIG. 2 by the dashed line in the region of the intermediate flange 16, the intermediate flange 16 can be formed in multiple layers from a plurality of layers lying on top of one another, wherein the tension rods 17, 18 in each case extend through all layers of the same.

Preferentially, the compensator 10 according to the invention is employed in piping of an exhaust system of an internal combustion engine, such as for example of a diesel internal combustion engine of a ship or diesel power plant internal combustion engine. The compensator 10 is a component of the exhaust system through which exhaust gas flows and thus part of piping of the same.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A compensator comprising:
a first connection flange;
a second connection flange;
a first corrugated bellows section that acts on the first connection flange and an intermediate pipe section;
a second corrugated bellows section that acts on the second connection flange and the intermediate pipe section;
the intermediate pipe section positioned between the first corrugated bellows section and the second corrugated bellows section;
an intermediate flange that surrounds the intermediate pipe section on the outside and positioned between the first connection flange and the second connection flange, wherein the intermediate flange is without connection or without rigid connection to the intermediate pipe section;
first tension rods that connect the intermediate flange to the first connection flange; and
second tension rods that connect the intermediate flange to the second connection flange.

2. The compensator according to claim 1, wherein
the first tension rods lie on a first axis, and
the second tension rods, lie on a second axis.

3. The compensator according to claim 2, wherein the first axis and the second axis intersect such a point of intersection of the first and second axes lies in an interior of the compensator.

4. The compensator according to claim 2, wherein the first axis and the second axis include an angle of 90°±10.

5. The compensator according to claim 4, wherein the first axis and the second axis include an angle of 90°±5.

6. The compensator according to claim 4, wherein the first axis and the second axis include an angle of 90°.

7. The compensator according to claim 1, wherein the compensator is produced from metallic materials.

8. The compensator according to claim 1, wherein the compensator, in respective regions of the intermediate pipe section, the first and second connection flanges, the intermediate flange, and the tension rods are produced from metallic materials whereas the compensator, in respective regions of the first and second corrugated bellows sections are produced from a non-metallic material.

9. The compensator according to claim 8, wherein the non-metallic material is one of a rubber material, a rubber-like material, and an elastomer material.

10. A compensator comprising:
a first connection flange;
a second connection flange;
an intermediate pipe section;
a first corrugated bellows section that acts on the first connection flange and the intermediate pipe section;
a second corrugated bellows section that acts on the second connection flange and the intermediate pipe section;
the intermediate pipe section is positioned between the first corrugated bellows section and the second corrugated bellows section;
an intermediate flange that surrounds the intermediate pipe section on the outside and positioned between the first connection flange and the second connection flange, wherein the intermediate flange is without connection or without rigid connection to the intermediate pipe section;
first tension rods that connect the intermediate flange to the first connection flange;
second tension rods that connect the intermediate flange to the second connection flange; and
a damping element arranged between the intermediate flange and the intermediate pipe section.

11. A compensator comprising:
a first connection flange;
a second connection flange;
an intermediate pipe section;
a first corrugated bellows section that acts on the first connection flange and the intermediate pipe section;
a second corrugated bellows section that acts on the second connection flange and the intermediate pipe section;
the intermediate pipe section is positioned between the first corrugated bellows section and the second corrugated bellows section;
an intermediate flange that surrounds the intermediate pipe section on the outside and positioned between the first connection flange and the second connection flange, wherein the intermediate flange is without connection or without rigid connection to the intermediate pipe section;
first tension rods that connect the intermediate flange to the first connection flange;
second tension rods that connect the intermediate flange to the second connection flange; and
an insulating material is arranged between the intermediate flange and the intermediate pipe section.

* * * * *